United States Patent [19]
Anderson

[11] Patent Number: 5,067,627
[45] Date of Patent: Nov. 26, 1991

[54] COFFEE FILTER DISPENSER

[76] Inventor: Michael L. Anderson, 5223 Arizona St., Camp Lejeune, N.C. 28542

[21] Appl. No.: 644,548

[22] Filed: Jan. 23, 1991

Related U.S. Application Data

[63] Continuation-in-part of Ser. No. 93,777, Sep. 8, 1987, abandoned.

[51] Int. Cl.$^5$ .............................................. B65H 3/00
[52] U.S. Cl. ...................................... 221/36; 221/40; 221/210; 221/213
[58] Field of Search ................... 221/36, 37, 40, 210, 221/213, 216, 255, 58, 214, 215, 220, 41, 42, 259

[56] References Cited

U.S. PATENT DOCUMENTS

| | | | |
|---|---|---|---|
| 1,864,008 | 6/1932 | Wright et al. | 221/1 X |
| 1,972,425 | 9/1934 | Montag | 221/216 |
| 2,443,520 | 6/1948 | Schwartz et al. | 221/213 |
| 3,065,878 | 11/1962 | Behrens et al. | 221/41 |
| 4,093,297 | 6/1978 | Reiber . | |
| 4,121,726 | 10/1978 | Pemberton | 221/37 |
| 4,269,324 | 5/1981 | Hausam | 221/36 |
| 4,339,057 | 7/1982 | Winters | 221/213 |
| 4,676,396 | 6/1987 | Mamolou | 221/36 |
| 4,684,128 | 8/1987 | Verstraeten | 221/210 |

FOREIGN PATENT DOCUMENTS

1154915 9/1963 Fed. Rep. of Germany ...... 221/213

Primary Examiner—David H. Bollinger
Attorney, Agent, or Firm—Jerry T. Kearns

[57] ABSTRACT

A first embodiment of a coffee filter dispenser has a housing in which a stack of coffee filters to be dispensed are received. A plurality of resilient grippers are axially movable between a retracted and an extended position. A crank arm is connected to the resilient grippers for actuation thereof. By manipulation of the crank arm in axial and rotary directions, a single coffee filter may be dispensed from a stack of coffee filters through resilient plastic flaps in the housing. In a second embodiment, a coffee filter dispenser utilizes an axially reciprocal and rotary plunger having an adhesive foot for removing the top filter from a stack of coffee filters. The adhesive foot is radially offset from the plunger axis, and a spiral cam groove on the plunger causes the foot to be displaced radially as the plunger moves axially. In this manner, a single coffee filter may be laterally dispensed through a pivotal door in the dispenser housing.

18 Claims, 6 Drawing Sheets

COFFEE FILTER DISPENSER

RELATED APPLICATIONS

This is a continuation-in-part of application Ser. No. 07/093,777, filed Sept. 8, 1987 and now abandoned.

BACKGROUND OF THE INVENTION

1. Field of the Invention

The present invention relates to coffee filter dispensers, and more particularly pertains to a new and improved coffee filter dispenser for dispensing a single coffee filter from a stack of coffee filters. Millions of automatic drip coffee makers are in use throughout the world. These automatic drip coffee makers utilize thin paper coffee filters. These coffee filters are sold nested in tightly stacked packages. Because of the extremely tight stacking of these coffee filters, it is difficult to remove just one coffee filter from the stack. Also, manual manipulation of the stack of coffee filters is unsanitary and inconvenient. The present invention is directed to the solution of the aforesaid problems by providing a dispensing container for storing and selectively dispensing a single coffee filter at a time from a stack of tightly packed coffee filters.

2. Description of the Prior Art

Various types of dispensing containers are known in the prior art. A typical example of such a dispensing container is to be found in U.S. Pat. No. 416,340, which issued to E. Moodie on Dec. 3, 1889. This patent discloses a dispensing container for toilet paper which is actuated by a manually reciprocal plunger. U.S. Pat. No. 748,795, which issued to E. Scheble on Jan. 5, 1904, discloses a vending machine for dispensing articles packaged in envelopes. The article dispensing mechanism is actuated by a manually operable crank arm. U.S. Pat. No. 2,788,736, which issued to G. Bardini on Apr. 16, 1957, discloses a fruit peel press for expressing oil from fruit peels. The device is actuated by a manually operable spring biased plunger. U.S. Pat. No. 3,090,523, which issued to P. Packman on May 21, 1963, discloses a device for separating and dispensing a single paper cup from a stack of paper cups. The device utilizes a spring biased supporting platform for maintaining the stack of paper cups at a constant vertical level. An axially reciprocable and laterally movable plunger is actuated by a manually operable lever. The device is designed to dispense pleated paper cups of the type commonly utilized in packaging chocolates, sweets, biscuits and cupcakes. The dispensing head utilizes suction to grasp each individual cup. U.S. Pat. No. 3,208,635, which issued to W. Saxe on Sept. 28, 1965, discloses a lever actuated napkin dispenser. This device utilizes a reciprocable carrier mechanism which includes a plurality of prongs for engaging the top napkin in a stack of napkins. U.S. Pat. No. 4,121,726, which issued to C. Pemberton on Oct. 24, 1978, discloses a device for dispensing paper coffee filters from the top of a nested stack. The device includes a box for storing and retaining the stack, a lever connected by a hinge to the lid of the box, a mechanism for moving the lever to engage the top filter of the stack, and flexible plastic fingers for holding all of the filters except the top one in place as the lever engages the top filter and removes it from the stack. The device utilizes a pointed lever for engaging the top filter. U.S. Pat. No. 4,269,324, which issued to L. Hausam on May 26, 1981, discloses a dispenser for coffee filters which includes a housing having an upper storage compartment for holding a stack of inverted coffee filters to be dispensed through a dispensing opening formed in the bottom of the compartment, the dispenser also includes a coffee filter engaging and gripping element mounted for movement into gripping engagement with the lower most coffee filter in the stack and subsequently delivering the coffee filter downwardly through the opening for easy access and use by the operator. The device is actuated by a manually rotatable crank.

While the above mentioned devices are suited for their intended usage, none of these devices provide a coffee filter dispenser which maintains the nested stack of filters in an enclosed housing and laterally dispenses a single filter through flaps in the housing. Further, none of the previously described dispensers utilize a plurality of resilient grippers provided with prongs for engagement of a single filter upon rotation of the grippers. Further, none of the aforesaid dispensers provide a coffee filter dispenser which utilizes an adhesive gripper to engage and laterally dispense a single coffee filter from a nested stack of filters. Another feature contemplated by the present invention and not disclosed by the above described prior art dispensers is the use of an axially movable plunger provided with a spiral cam groove for laterally moving an adhesive gripper. Inasmuch as the art is relatively crowded with respect to these various types of coffee filter dispensers, it can be appreciated that there is a continuing need for and interest in improvements to such coffee filter dispensers, and in this respect, the present invention addresses this need and interest.

SUMMARY OF THE INVENTION

In view of the foregoing disadvantages inherent in the known types of coffee filter dispensers now present in the prior art, the present invention provides an improved coffee filter dispenser. As such, the general purpose of the present invention, which will be described subsequently in greater detail, is to provide a new and improved coffee filter dispenser which has all the advantages of the prior art coffee filter dispensers and none of the disadvantages.

To attain this, representative embodiments of the concepts of the present invention are illustrated in the drawings and make use of an enclosed housing for storing a stack of nested coffee filters. A first embodiment of the present invention utilizes a spring biased supporting platform for maintaining a nested stack of filters at a predetermined constant vertical level. The first embodiment of the invention utilizes a plurality of resilient grippers provided with engaging prongs. The grippers are mounted for axial movement and are radially expanded and contracted by a stationary cam sleeve. The first embodiment of the coffee filter dispenser is provided with a manually actuatable crank mounted for axial movement to extend the resilient grippers and also mounted for rotary motion to engage the prongs on the resilient grippers with the top filter in a nested stack of filters. A second embodiment of the present invention utilizes a housing having a pivotal door for dispensing the coffee filters. The second embodiment of the present invention utilizes an axially movable plunger provided with a radially offset adhesive foot for engaging the top coffee filter in a nested stack of filters. The plunger is provided with a spiral cam groove to control the lateral position of the adhesive foot. A plurality of resilient plastic grippers in conjunction with an adhesive element are utilized to hold the stack of coffee filters in position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved coffee filter dispenser which has all the advantages of the prior art coffee filter dispensers and none of the disadvantages.

It is another object of the present invention to provide a new and improved coffee filter dispenser which may be easily and efficiently manufactured and marketed.

It is a further object of the present invention to provide a new and improved coffee filter dispenser which is of a durable and reliable construction.

An even further object of the present invention is to provide a new and improved coffee filter dispenser which is susceptible of a low cost of manufacture with regard to both materials and labor, and which accordingly is then susceptible of low prices of sale to the consuming public, thereby making such coffee filter dispensers economically available to the buying public.

Still yet another object of the present invention is to provide a new and improved coffee filter dispenser which provides in the apparatuses and methods of the prior art some of the advantages thereof, while simultaneously overcoming some of the disadvantages normally associated therewith.

Still another object of the present invention is to provide a new and improved coffee filter dispenser which utilizes a plurality of resilient grippers to engage and laterally dispense a single coffee filter from a nested stack of filters from an enclosed housing.

Yet another object of the present invention is to provide a new and improved coffee filter dispenser which is manually actuated by an axially and rotationally manipulatable crank arm.

Even still another object of the present invention is to provide a new and improved coffee filter dispenser which utilizes a manually actuatable plunger provided with an adhesive foot for engaging and laterally dispensing a single coffee filter from a nested stack of filters through a pivotal door in an enclosed dispenser housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
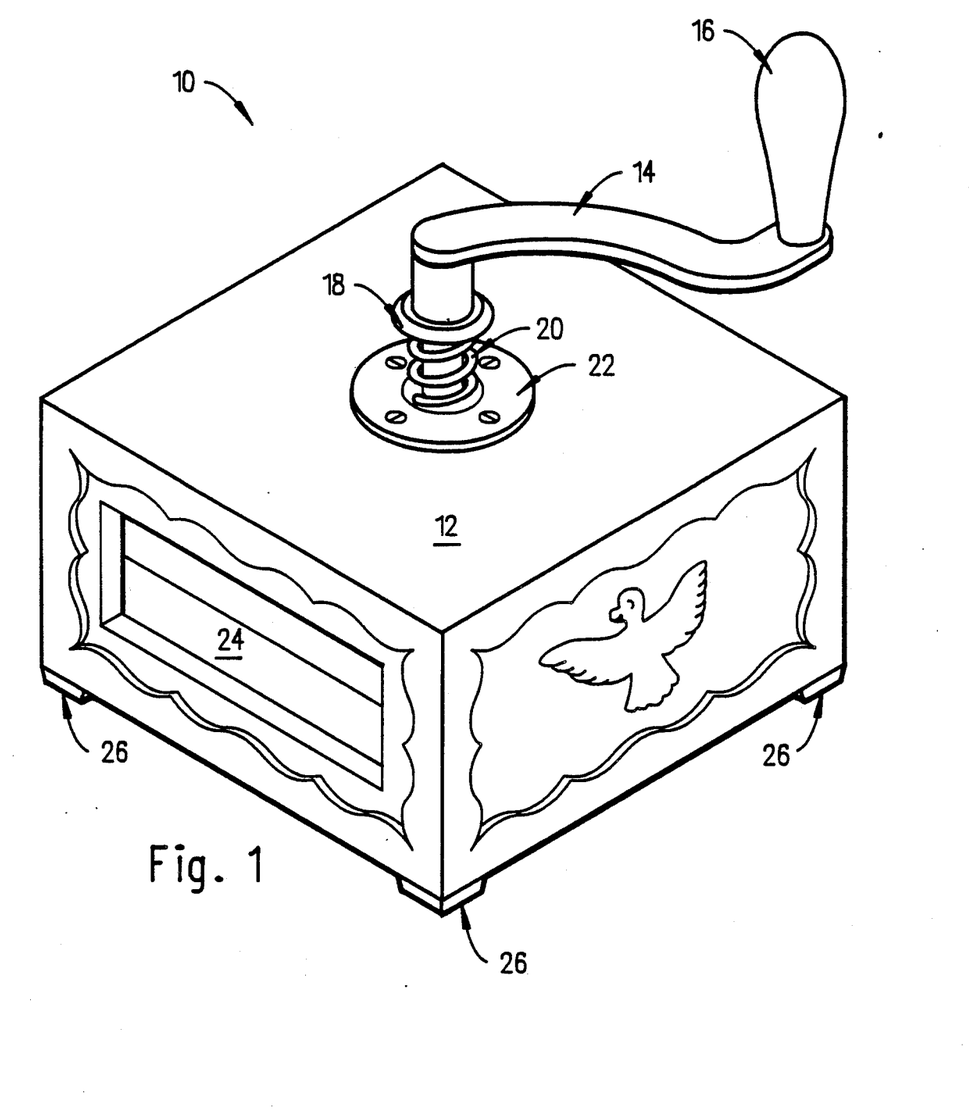
FIG. 1 is a perspective front view of a coffee filter dispenser according to a first embodiment of the present invention.

With reference now to the drawings, and in particular to FIG. 1 thereof, a new and improved coffee filter dispenser embodying the principles and concepts of the present invention and generally designated by the reference numeral 10 will be described.

More specifically, it will be noted that the first embodiment 10 of the invention includes a housing 12 having a top wall through which a crank arm 14 is mounted. The crank arm 14 has a handle 16 through which it may be axially moved against the bias of a coil spring 20. The coil spring 20 abuts a flange 18 on the crank arm 14. The handle 16 is also utilized to rotate the crank arm 14 for purposes which will be subsequently described. A mounting flange 22 is utilized to secure a stationary cam sleeve within the housing 12. A pair of flexible plastic flaps 24 serve to cover a lateral opening in the housing 12. A plurality of rubber feet 26 are positioned at the bottom corners of the housing 12 for supporting the coffee filter dispenser 10 on a flat surface.

Figure 2:
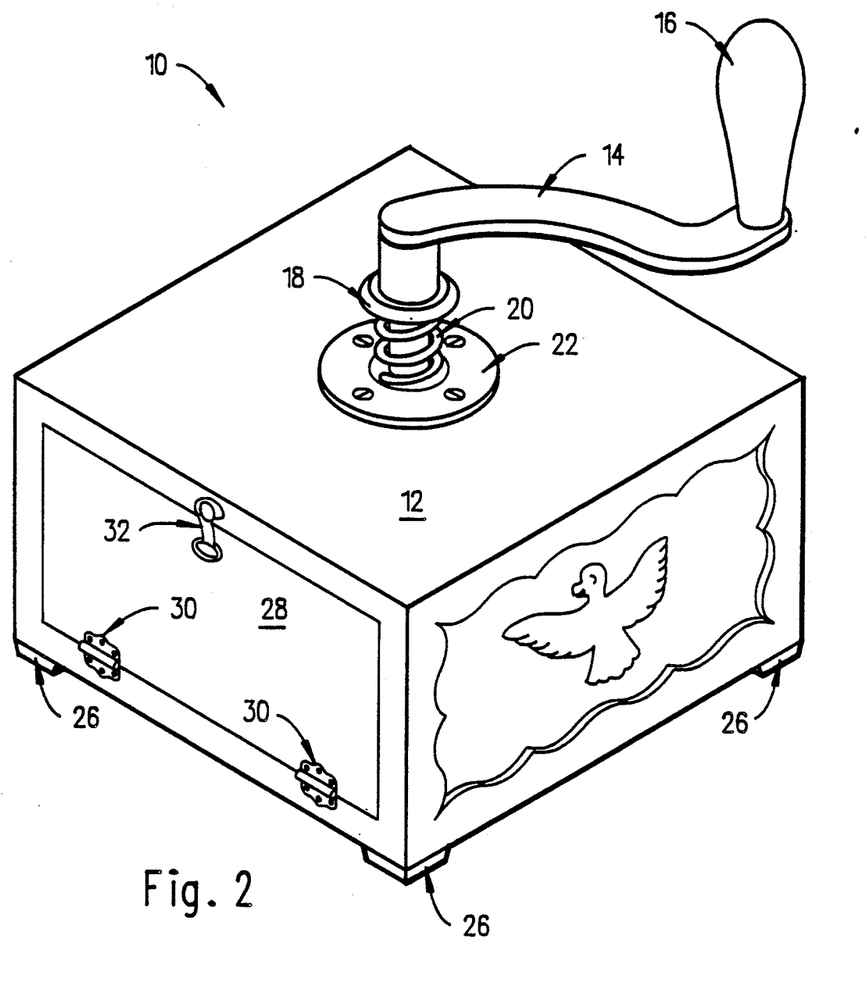
FIG. 2 is a rear perspective view of the coffee filter dispenser of FIG. 1.

With reference now to FIG. 2, a rear perspective view of a coffee filter dispenser 10 according to a first embodiment of the invention is provided. It will be apparent that the housing 12 is provided with a rear opening covered by a door 28. The door 28 is mounted for swinging movement relative to the housing 12 by hinges 30. A latch 32 is provided for securing the door 28 in a closed position. The door 28 is utilized for the purpose of inserting a stack of nested coffee filters to be dispensed into the interior of the housing 12. As will be apparent from FIGS. 1 and 2, the coffee filter dispenser 10 of the first embodiment of the present invention is designed so as to resemble an early American coffee bean grinder. Of course, other designs for the housing 12 may be utilized without departing from the scope of the present invention.

Figure 3:
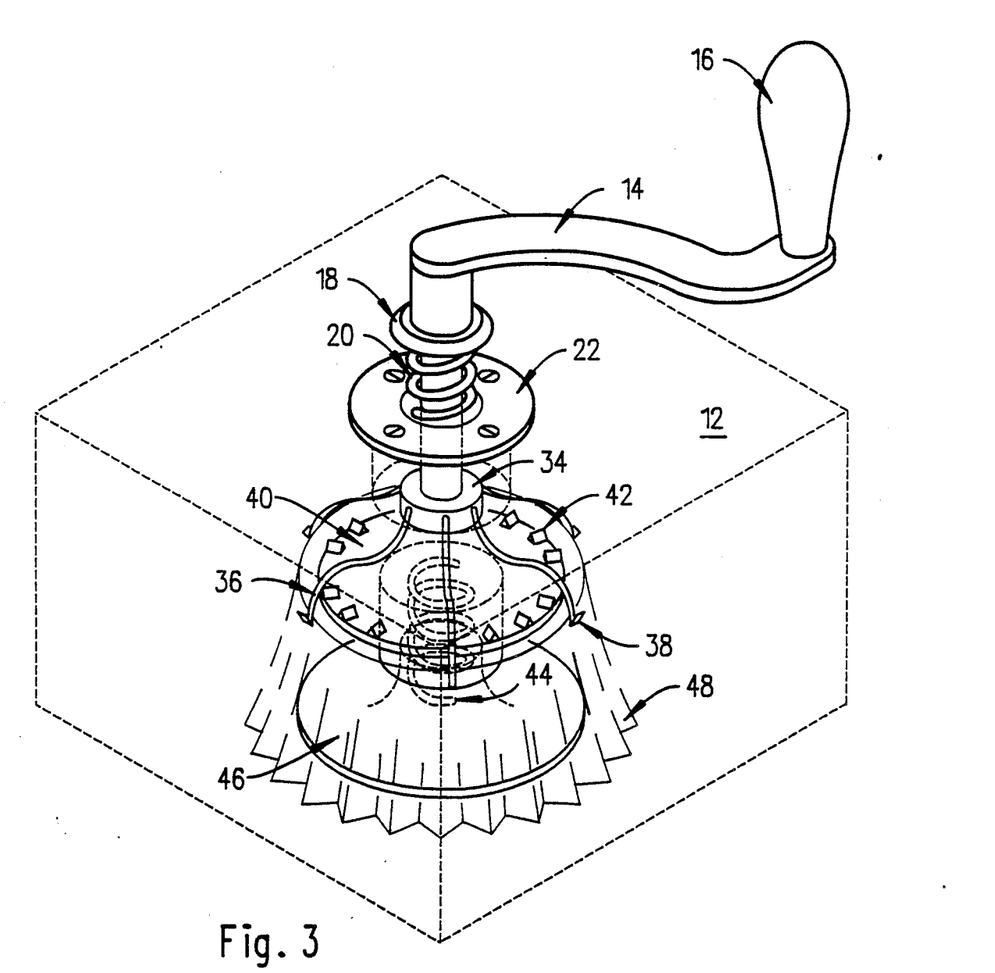
FIG. 3 is a skeletal perspective view of the operating mechanism of the coffee filter dispenser of FIGS. 1 and 2.

With reference now to FIG. 3, a skeletal view illustrating the operative mechanism of the coffee filter dispenser 10 of the first embodiment of the present invention is provided. A vertically extending portion of the crank arm 14 extends through the housing 12 and forms a plunger which is secured to end portions of a plurality of resilient grippers 36. A cam sleeve 34 is integrally connected to the cam mounting sleeve 22 and serves to radially retract the resilient grippers 36 when the crank arm 14 is allowed to be moved upwardly by the force of coil spring 20 on the flange 18. The resilient grippers 36 may be moved to the illustrated extended position by exerting a downward axial force on the handle 16. Each of the resilient grippers 36 is provided with a pin like prong 38 for engaging the top filter of a stack of nested coffee filters 48. The prongs 38 are engaged with the top filter upon rotation of the crank arm 14 by manipulation of the handle 16. A filter support platform 40 is provided with a plurality of rubber pips which serve to maintain the filter stack 48 in position. The filter support platform 40 is provided with a resilient spring mount 44, by means of which the coffee filter stack 48 will be maintained at a constant vertical position. The coil spring 44 extends between the bottom of the filter support platform 40 and the top of a platform base 46 which is secured to the housing 12.

With reference now to FIG. 3, the manner of usage of the coffee filter dispenser 10 of the first embodiment of the present invention will now be described. A nested stack of coffee filters 48 is first inserted into the interior of housing 12 through door 28 (FIG. 2) and the door 28 is then closed and secured by latch 32. Thus, coffee filters 48 are provided with a clean, dust free storage container. The coffee filter stack 48 is placed in an inverted position over the filter support platform 40. Engagement of the soft rubber pips 42 with the bottom surface of the last coffee filter will maintain the coffee filter stack 48 in a stationary position on the filter support platform 40. As the filters are individually and sequentially dispensed from the filter stack 48, the coil spring 44 will elevate the filter support platform 40, maintaining the top filter of the stack at a constant vertical position. This result is achieved by utilizing a coil spring having a spring constant just sufficient to elevate filter support platform 40 the thickness of one coffee filter when the weight of one coffee filter is removed from the filter support platform 40. To dispense a single coffee filter from the stack of filters 48, a downward force is exerted on handle 16, thus extending the resilient grippers 36 out of the cam sleeve 34 and positioning the prongs 38 on the top filter of the stack 48. By now rotating the crank 14 through manipulation of handle 16, the prongs 38 are engaged with the top filter. This rotation of the crank 14 will cause the edges of the top filter to be extended out of the housing 12 through the flexible plastic flaps 24 (FIG. 1). By now releasing the handle 16, the spring 20 will bias the crank arm 14 upwardly through engagement with flange 18. This results in a retraction of the resilient grippers 36 and disengagement of the prongs 38 with the filter. The dispensed filter may now be easily withdrawn through the plastic flaps.

The pin-like prong 38 on each of the grippers 36 are dimensioned to engage or penetrate only the outermost filter in the stack 48. FIG. 3 illustrates the grippers 36 in an extended position, with the prongs 38 in engagement with the top outermost filter. As shown, the prongs 38 are positioned to engage the filter at a position on the circular sidewall very near to the flat circular filter bottom. At this point, the handle 14 is rotated, which causes the top filter to be spun loose from the next filter adjacent filter in the stack. It is pointed out that the pleated construction of the filters tends to cause a frictional binding of the stacked filters, which is overcome by the engagement of the prongs 38 with only the top outermost filter, in conjunction with the rotation of the handle 14. At this point, the handle 14 is allowed to be moved upwardly, which, as described above, causes a radial retraction of the grippers 36. Because of the engagement of the grippers at a point very near to the bottom of the filter, this radial retraction causes the free edge of the filter to expand radially, while radially contracting the filter near the flat bottom portion. This phenomena is inherent from the conventional construction of the filter, and may be illustrated by grasping a filter around the cylindrical pleated sidewall, near the flat bottom, with circumferentially spaced fingers, and slowly squeezing. This radial expansion of the free edge of the filter causes this free edge to be extended out through the flaps 24, which are very flexible and offer little resistance to the outward extension of the filter. As described at page 17, line 10, the device is designed to only slightly extend the edge of the filter out through the flaps, at which point it may be manually grasped. Because of the small extent of the pin-like prongs 38 (sufficient to engage only one filter), engagement of the filter edge with the flaps 24, and further axial and radial retraction of the grippers 36, the prongs 38 are pulled from engagement with the filter. In practice, this may form extremely small tears in the filter, but due to the small size of the pin-like prongs 38, these are not significantly deleterious to the subsequent performance of the filter.

Figure 4:
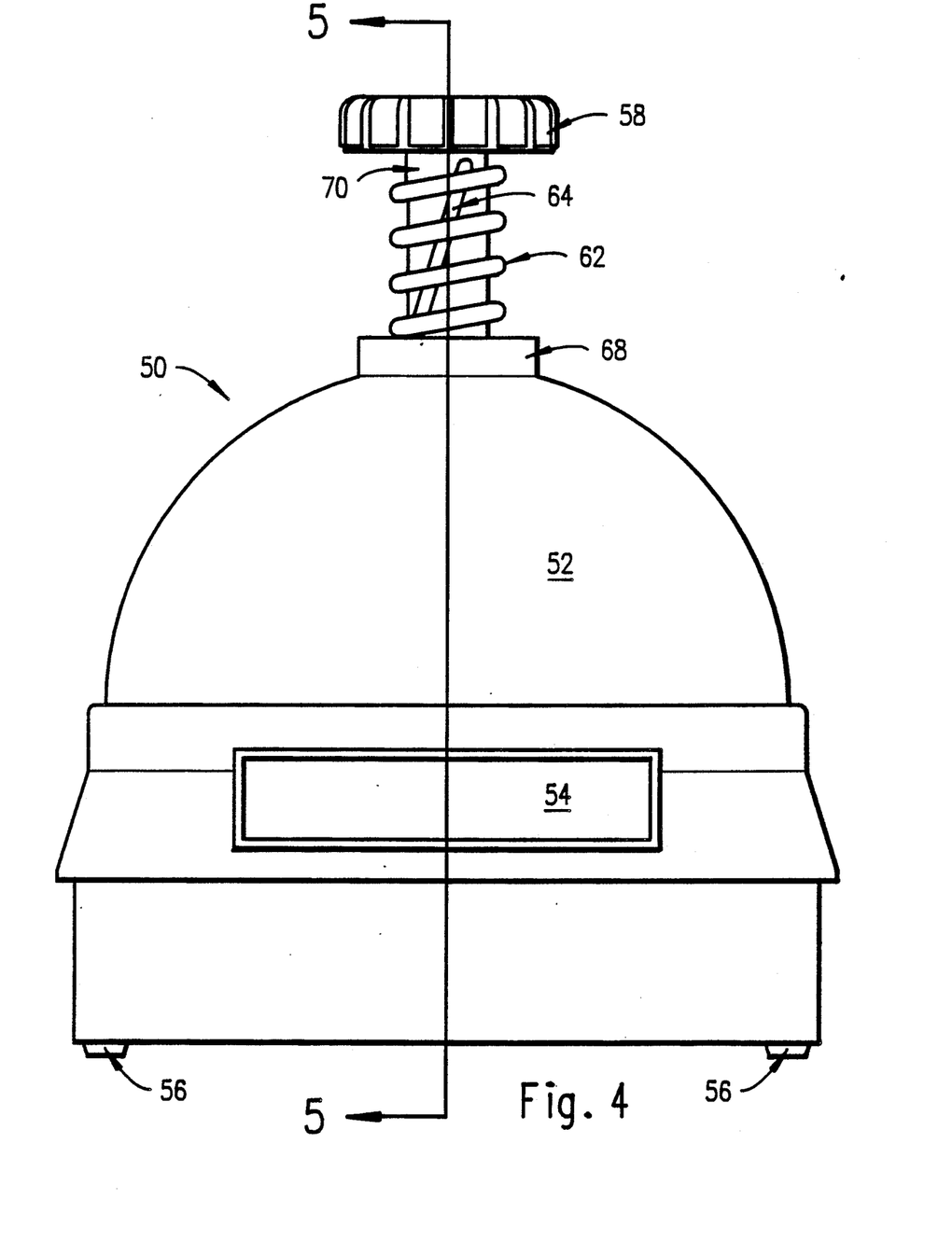
FIG. 4 is a front perspective view of a coffee filter dispenser according to a second embodiment of the present invention.

With reference now to FIG. 4, a second embodiment 50 of a coffee filter dispenser according to the present invention will now be described. More specifically, it will be noted that the second embodiment 50 of the invention includes a housing 52 having a lateral opening enclosed by a pivotal door 54. A plurality of rubber feet 56 are provided at the bottom corners of the housing 52 and serve to support the coffee filter dispenser 50 on a flat surface. A knob 58 is connected to a plunger which extends through an opening in the top of the housing 52. The knob 58 is biased upwardly by a coil spring 62.

Figure 5:
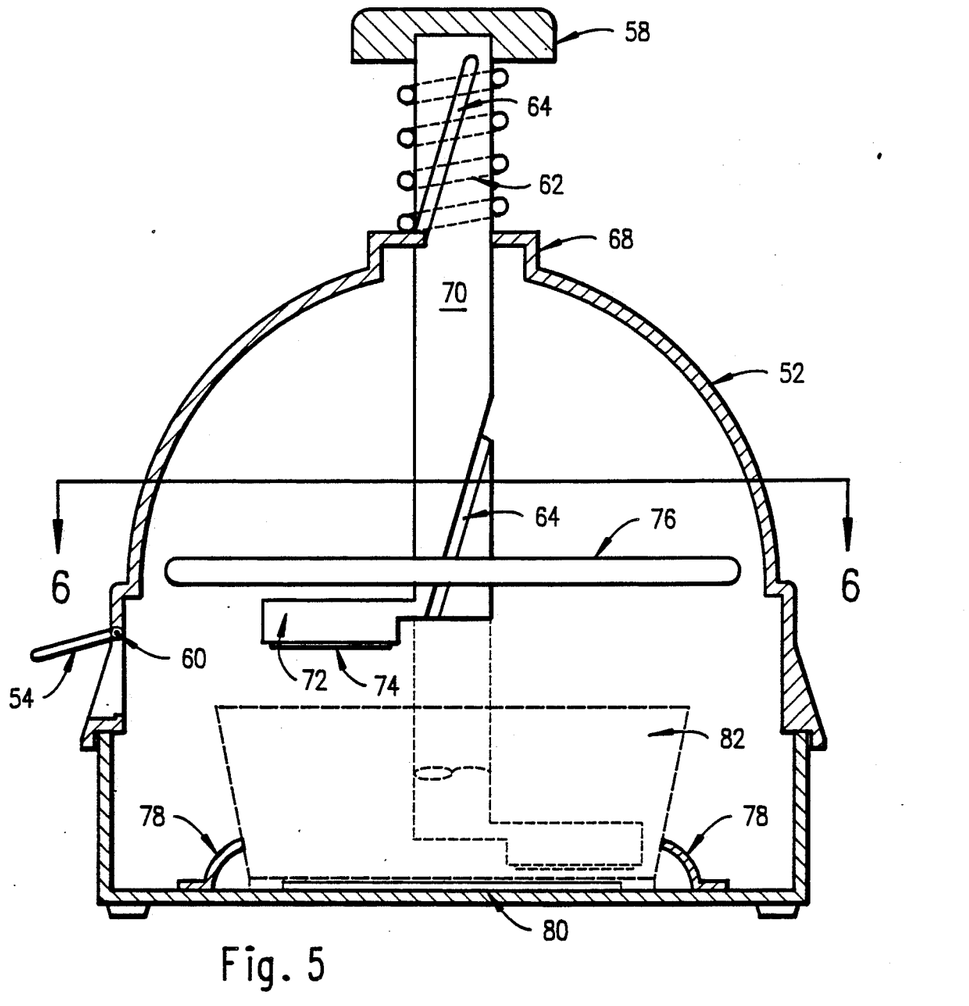
FIG. 5 is a cross sectional view taken along lines 5—5 of FIG. 4.

With reference now to FIG. 5, which is a cross sectional view of the coffee filter dispenser 50, the operating mechanism will now be described. Knob 58 is integrally formed with a plunger 70 which extends through the top of the housing 52. The plunger 70 is provided with a very slow pitch spiral cam groove 64 which engages a follower pin 66 formed on the housing 52. Coil spring 62 serves to bias the plunger axially upwards. A support sleeve 68 formed on the housing 52 serves to guide the plunger 70. A pivotal door 54 is connected by a hinge 60 to the housing 52. A foot portion 72 is formed on the plunger 70 in a radially offset position. A tacky adhesive 74 is applied to the bottom surface of the foot 72. The tacky adhesive manufactured by 3-M and utilized on POST-IT NOTES may be utilized. A stripper ring 76 surrounds the plunger 70 and foot 72 and is attached to the housing 52. A plurality of resilient plastic grippers 78 are circumferentially arranged on a bottom interior surface of the housing 52. A tacky adhesive element 80 is positioned centrally on a bottom interior surface of the housing 52. A stack of nested coffee filters 82 is secured in an upright position within the housing 52 by the resilient plastic grippers 78 and the adhesive element 80. The lower portion of the housing 52 is removable from the upper portion to provide access to the interior of the dispenser.

Figure 6:
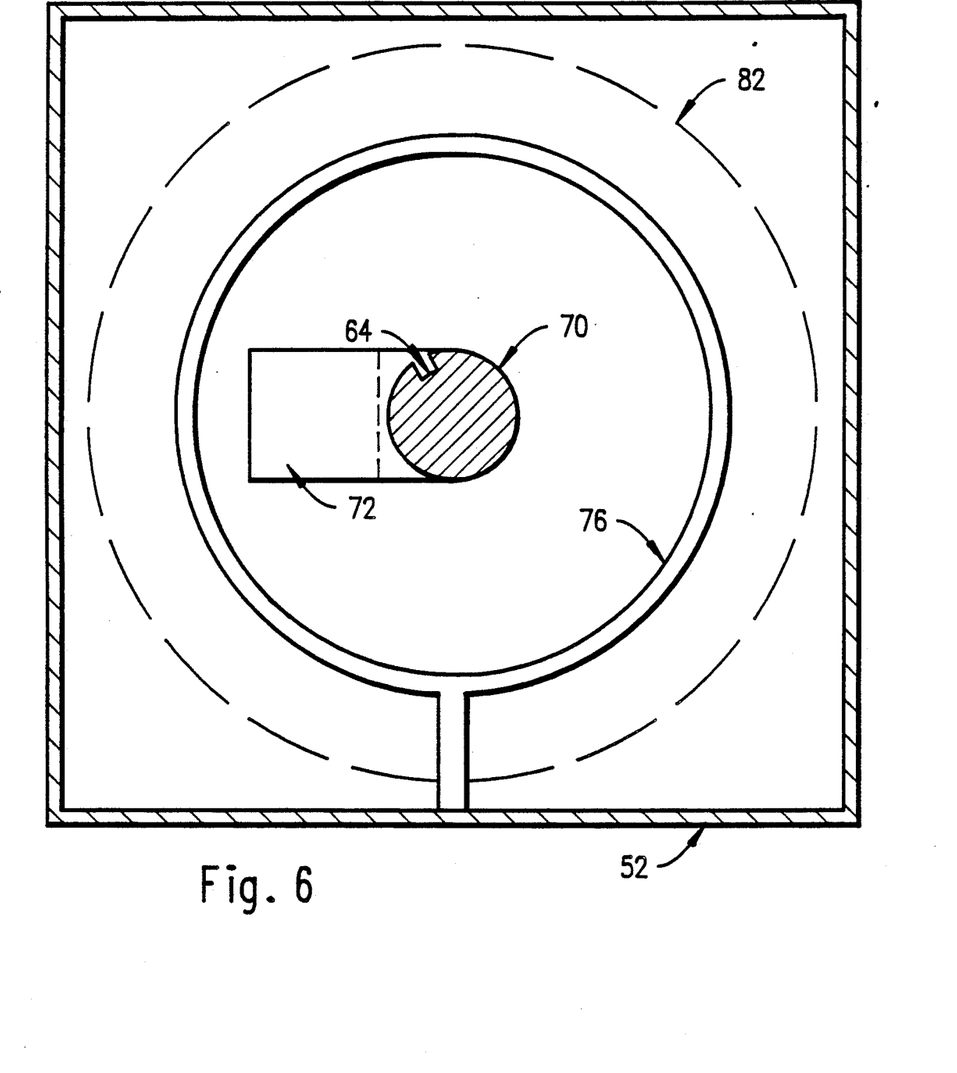
FIG. 6 is a cross sectional view taken along lines 6—6 of FIG. 5.

The relative location of the various parts may be better understood with reference to FIG. 6.

The operation of the coffee filter dispenser 50 of the second embodiment of the present invention, which will be best understood with reference to FIG. 5, will now be described. A nested stack of coffee filters 82 is first inserted in an upright position through door 54 into the housing 52. The filter stack is secured in position by resilient plastic grippers 78 and adhesive element 80. To dispense a single coffee filter from the stack of filters 82, the plunger 58 is manually depressed. This serves to extend the plunger 70 and attached foot 72 to the position illustrated in dotted lines. In this position, the tacky adhesive 74 on the foot 72 engages the bottom inner surface of the top coffee filter in the stack 82. By now releasing the knob 58, the plunger 70 will return to a raised position by virtue of the force of the coil spring 62. At the same time, the engagement of the cam pin 66 in the spiral cam groove 64 will serve to rotate the plunger 70 and foot 72 to a position in which the foot 72 is positioned adjacent the door 54. As the plunger 70 continues axially upwards, the stripper ring 76 will engage the coffee filter carried by the adhesive 74 on the foot 72. The ring strips the coffee filter from the foot 72. At this time, the edge of the coffee filter will extend outwardly through the pivoted door 54. As the filter is now disengaged from the foot 72, it may be easily removed from the housing. At this point, the door 54 will pivot to its closed position, thus sealing the housing 52 from the entrance of dust and other contaminants. Thus, it will now be appreciated, that the filters may be individually and sequentially dispensed from the stack of nested filters 82 by merely depressing and then releasing the knob 58.

It should be noted that the adhesive 74 and 80 is of the type which will leave no adhesive residue on the coffee filters. The adhesive 74 and 80 may be supplied as replaceable adhesive strips, whereby the adhesives may be replaced if necessary.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved coffee filter dispenser, comprising:
   housing means;
   door means in said housing means;
   means for holding a stack of nested coffee filters in said housing;
   plunger means mounted for axial and rotary motion, extending through said housing means; and
   means for engaging a top filter of said stack of nested coffee filters, attached to said plunger means, whereby a single coffee filter may be dispensed through said door means.

2. The coffee filter dispenser of claim 1, wherein said door means comprises a pair of flexible plastic flaps attached to said housing means.

3. The coffee filter dispenser of claim 1, wherein said holding means comprises a support platform having a plurality of upwardly extending rubber pips.

4. The coffee filter dispenser of claim 1, wherein said holding means comprises a spring biased support platform for holding a stack of nested coffee filters at a constant vertical position.

5. The coffee filter dispenser of claim 1, wherein said holding means comprises a spring biased platform having a plurality of upwardly extending rubber pips for engaging a stack of nested coffee filters and maintaining the stack at a constant vertical position.

6. The coffee filter dispenser of claim 1, where said engaging means comprises a plurality of resilient grippers for surrounding a top filter of a stack of nested coffee filters.

7. The coffee filter dispenser of claim 6, wherein said resilient grippers are surrounded by a cam sleeve for allowing said resilient grippers to extend radially as they are moved axially out of said cam sleeve and for radially retracting said resilient grippers as they are moved axially upwards into said cam sleeve.

8. The coffee filter dispenser of claim 6, wherein said resilient grippers are each provided with a prong for engaging a coffee filter.

9. The coffee filter dispenser of claim 1, wherein a crank arm having a handle is attached to said plunger. means for axially and rotationally displacing said plunger.

10. The coffee filter dispenser of claim 9, wherein said crank arm is biased axially upwardly by a spring.

11. The coffee filter dispenser of claim 1, wherein said engaging means comprises an adhesive foot attached to said plunger means.

12. The coffee filter dispenser of claim 1, wherein said plunger means is provided with a spiral groove and said housing is provided with a cam pin engaging said spiral groove whereby said plunger means is rotated as it is displaced axially.

13. The coffee filter dispenser of claim 12, wherein a spring is provided for biasing said plunger means axially upwardly.

14. The coffee filter dispenser of claim 1, wherein said door means comprises a door pivotally attached to said housing means.

15. The coffee filter dispenser of claim 1, wherein said holding means comprises a plurality of resilient plastic grippers attached to a bottom interior surface of said housing for holding a stack of nested coffee filters.

16. The coffee filter dispenser of claim 15, wherein said holding means further comprises an adhesive element attached to a bottom interior surface of said housing and arranged centrally of said resilient plastic grippers.

17. The coffee filter dispenser of claim 1, wherein a stripper ring surrounds said plunger means for disengaging a coffee filter from said plunger means.

18. A new and improved coffee filter dispenser, comprising:
- a housing;
- a loading door in said housing for inserting a stack of nested coffee filters into an interior of said housing;
- a dispensing door comprising a pair of flexible plastic flaps in said housing;
- a platform base attached to a bottom interior surface of said housing;
- a filter support platform supported by a spring on said platform base;
- a plurality of rubber pips on an upper surface of said support platform;
- a cam sleeve stationarily mounted on an upper surface of said housing and extending downwardly within said housing;
- a plurality of resilient grippers each having a filter engaging prong extending downwardly through said cam sleeve;
- a plunger extending into said cam sleeve and connected to said resilient grippers;
- a crank arm connected to said plunger;
- a coil spring surrounding said plunger and upwardly biasing said crank arm; and
- a handle connected to said crank arm for rotating and axially moving said plunger.

* * * * *